UNITED STATES PATENT OFFICE.

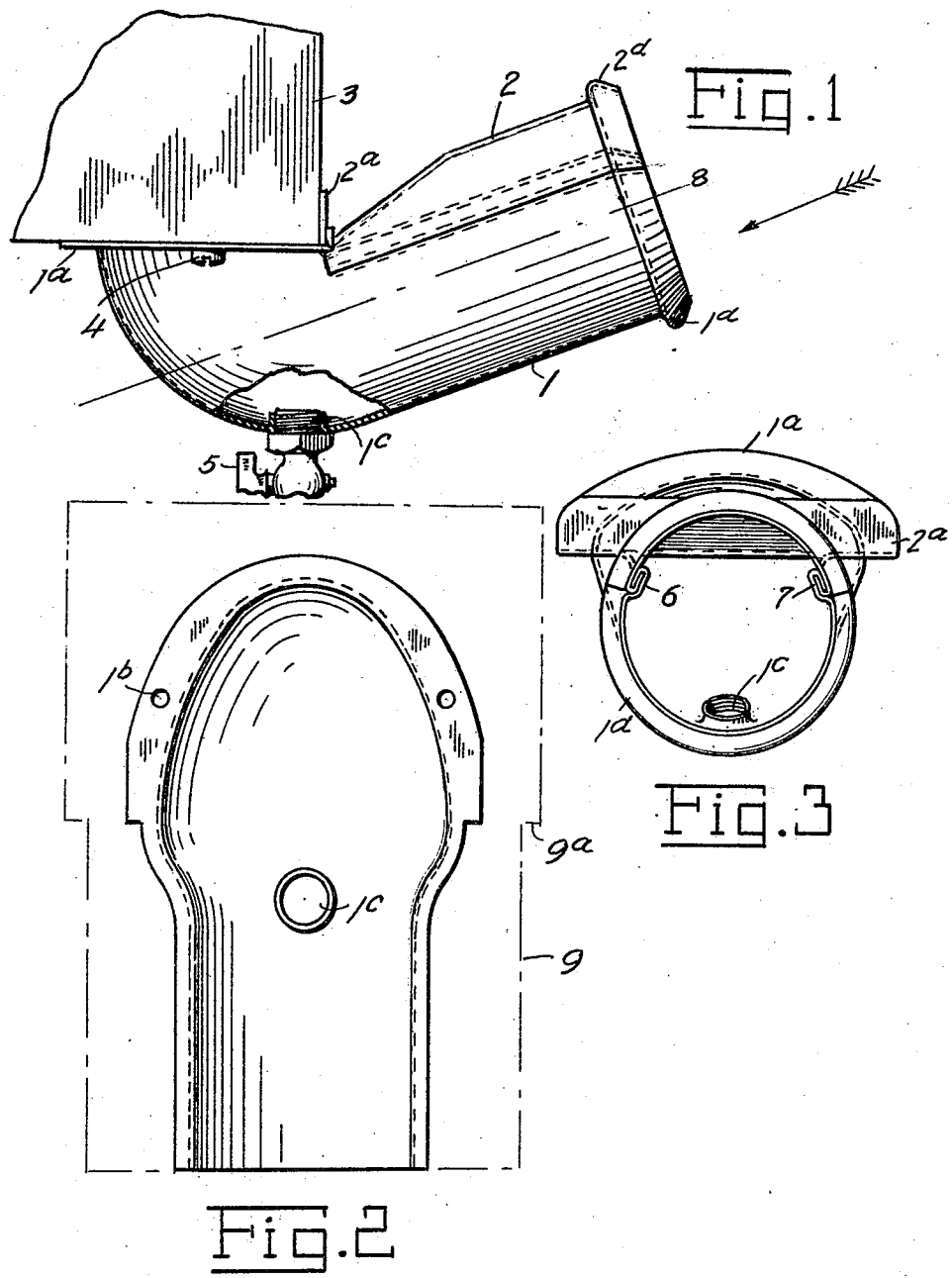

CHARLES F. SPERY, OF CHICAGO, ILLINOIS.

RADIATOR OUTLET.

1,413,624.   Specification of Letters Patent.   Patented Apr. 25, 1922.

Application filed June 19, 1920. Serial No. 390,277.

*To all whom it may concern:*

Be it known that I, CHARLES F. SPERY, a citizen of the United States, residing at Chicago, in the county of Cook and State of Illinois, have invented new and useful Improvements in Radiator Outlets, of which the following is a specification.

This invention has relation to radiators, such as used in self propelled vehicles, and it has particular reference to outlet connections for such radiators.

In a well known type of automobile there extends, from the bottom of the radiator, an outlet elbow made from malleable cast iron. Such structure is undesirable on account of its cost and because of the difficulty of joining it water-tightly to the radiator. It is also difficult to obtain such cast elbows in sufficient quantities to meet the demands. With these conditions in view the object of the present invention is the provision of a simple and inexpensive sheet metal structure shaped to take the place of the aforenamed casting. The further objects and the advantageous features of my invention are hereinafter fully explained and illustrated in the appended drawing, of which:

Fig. 1 shows, in side elevation, a portion of an automobile radiator to which is attached an outlet structure embodying the invention, Fig. 2 is a plan view of one of the members which combine to form the structure of Fig. 1, and Fig. 3 is a rear view looking at the structure in the direction indicated by the arrow.

The radiator outlet member commonly used is, as hereinbefore stated, a solid malleable iron casting. The structure of my invention, on the other hand, is built up and comprises a relatively large bottom part 1 and a smaller top portion 2. Both parts are made from thin rust resisting metal, such as brass, and they are provided with flanges $1^a$, $2^a$ disposed at right angles to each other in order to fit the rear bottom corner of the radiator 3. The aforenamed cast elbow does not fit very well on the radiator on account of the roughness and unevenness of the material, whereas my sheet metal structure may be perfectly shaped for its purpose without additional expense. In the flange $1^a$ are punched holes $1^b$, dimensioned to receive suitable fastening elements, such as a plurality of screws 4. After the structure is mounted in place it is made water tight by a soldering process, and here too my sheet metal elbow presents an advantage over the cast iron one. The brass structure takes solder very readily and a good joint is quickly obtained along the close fitting edges, whereas it is more difficult to make the solder seal the cast elbow on account of the nature of the metal and also because of its imperfect shape.

At the bottom of my structure is provided an orifice $1^c$, and the said orifice is screw threaded to receive a suitable drain cock 5. As the metal is very thin, and in order to afford a sufficient number of screw threads to prevent leakage, the edge of the said orifice is conveniently drawn inward, as indicated in the drawing. From the said orifice the elbow extends rearward, with a slight rise, and it terminates in a cylindrical tube adapted to receive the usual connecting hose (not shown). It is noticed that the rear edge is enlarged to form a rim $1^d$, $2^d$ over which the said hose is forced in order to provide a tight joint, as well known to those versed in the art.

The upper and lower members of the structure are joined together by water tight seams, such as the lock seams 6 and 7. The said seams are positioned somewhat above and parallel with the centerline 8 of the cylindrical rear portion of the elbow, and they extend from the points where the flanges $1^a$, $2^a$ are joined together. This peculiar construction is necessary in order to form the parts correctly, with the flanges as described, and without danger of tearing the metal. And it is also the most desirable construction because waste of material is substantially eliminated. Upon examining Fig. 2 it is seen that the part shown is surrounded by a broken outline, 9, and the said line represents substantially the shape of the metal before forming. Similarly it will be found, as will readily be appreciated by anyone versed in the art, that the outline of the blank of the top piece 2, before forming, is substantially rectangular.

I claim:

1. The combination with a radiator, of an outlet elbow made from two strips of sheet metal combined by longitudinal seams and formed with flanges for attachment to the radiator, said elbow being made with a bottom perforation the edges of which are drawn inward so as to provide a surface for screw threads, and a drain cock engaging said screw threads.

2. A radiator outlet elbow comprising two sheet metal members tightly joined together by longitudinal seams, each part provided with a flange, said flanges fitting the bottom corner of the radiator.

3. A radiator outlet elbow comprising a large bottom member and a smaller top member, both members made from sheet metal and tightly joined by longitudinal seams, and each member formed with a flange for attachment to the radiator, the said flanges set at right angles to each other so as to fit the bottom corner of the radiator.

4. A radiator outlet elbow having flanges for attachment to the bottom corner of the radiator and formed to extend rearward and upward from the radiator bottom corner, said elbow comprising two metal members having seamed edges extending from the juncture of the said flanges and parallel with the direction of the rear portion of the elbow.

5. A radiator outlet elbow made from sheet metal in two parts, said parts being joined together by longitudinal seams along the cylindrical rear portion of the elbow, said rear portion terminating in an enlarged rim for the attachment of a connecting tube.

CHARLES F. SPERY.